J. WHITAKER.
Collars for Car-Axle-Boxes.

No. 147,722. Patented Feb. 17, 1874.

Witnesses:

Inventor:
Joseph Whitaker
by his Attorneys

UNITED STATES PATENT OFFICE.

JOSEPH WHITAKER, OF WOONSOCKET, RHODE ISLAND, ASSIGNOR TO SIMEON S. COOK, OF SAME PLACE.

IMPROVEMENT IN COLLARS FOR CAR-AXLE BOXES.

Specification forming part of Letters Patent No. 147,722, dated February 17, 1874; application filed January 21, 1874.

*To all whom it may concern:*

Be it known that I, JOSEPH WHITAKER, of Woonsocket, in the county of Providence and State of Rhode Island, have invented certain new and useful Improvements in Oil Cut-Offs for Car-Axles; and I do hereby declare the following to be a full and exact description of the same, reference being had to the accompanying drawing, forming part of this specification, in which—

Figure 1:
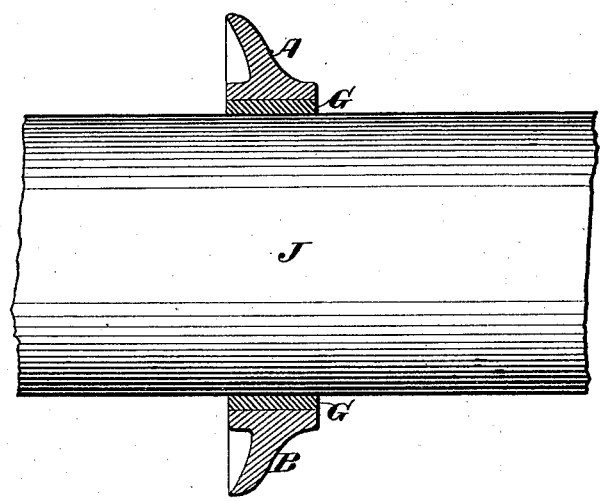
Figure 2:
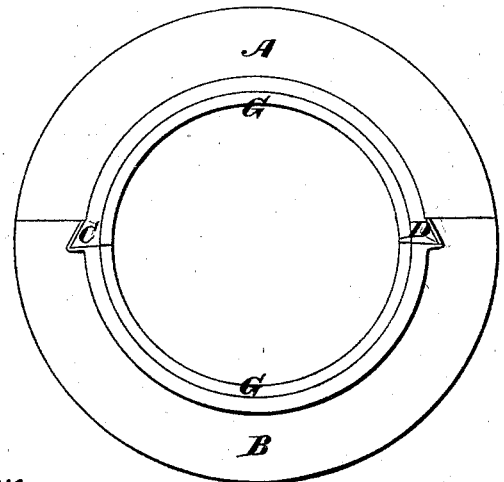
Figure 3:
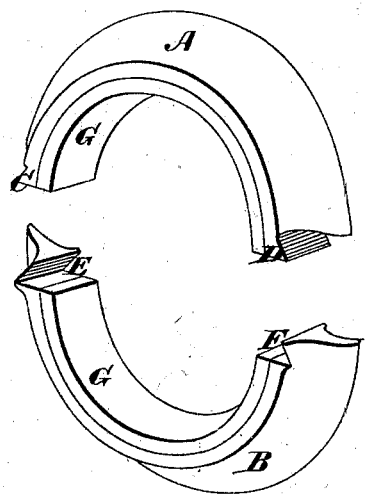

Figure 1 is a transverse section of the oil cut-off applied to a journal. Fig. 2 is a side view of the cut-off when the parts are joined together, and Fig. 3 is a perspective view of the oil cut-off when the parts are separated.

Similar letters of reference in the accompanying drawings denote the same parts.

My invention relates to improvements in oil cut-offs on car-axles, the oil being fed to the axle by any of the numerous devices employed for that purpose; and it consists, first, in the employment of a compressible elastic packing attached to the interior circumference of the collar or oil cut-off, the packing lying between the car-axle and the oil cut-off or collar, and having the functions of preventing the escape of oil, of serving to attach the cut-off to the axle, so that it will revolve with it, and of yielding to lateral displacements of the cut-off, and at the same time retaining its hold on the car-axle. My invention further consists in forming the oil cut-off in two parts, united together by inclined mortises and tenons, so that the two may be made to encircle the car-axle and spring into place around it.

In the accompanying drawings, A B are the two semicircular parts of the oil cut-off or collar, which is made to encircle the car-axle J. Inclined or wedge-shaped tenons C D are formed at each extremity of the semicircular part A of the cut-off, which fit and are made to spring into correspondingly-formed inclined mortises E F made in the ends of the semicircular part B. By this construction the oil cut-off can readily be removed from the car-axle when desired, or replaced and sprung into position encircling the axle. G is a packing, made of compressible elastic material, filling the space between the interior circumference of the oil cut-off and the car-axle, so as to prevent the escape of oil along the journal. This packing fits tightly between the cut-off and car-axle, so that the former will revolve with the latter, while the cut-off is rendered, from the construction, capable of yielding to any lateral displacement it is subjected to, at the same time retaining its bite or hold upon the axle.

The packing, obviously, may be applied to the cut-off, whether the latter be made in one or two parts, and by its use the expense of turning the perforation in the cut-off so as to fit accurately and oil-tight on the axle is obviated.

By making the cut-off revolve with the axle, in contradistinction to the employment of a fixed or stationary cut-off, in the interior circle of which the axle revolves, I obviate entirely the wear on the interior circle of the cut-off, which arises in the employment of the stationary cut-off.

I claim as my invention—

1. A collar having the interior surface lined with a compressible elastic packing, in combination with the car-axle J, the collar to revolve with and retain its hold on the axle and yielding to lateral displacements, substantially as described, and for the purposes set forth.

2. The semicircular part A, provided with inclined tenons C D, in combination with the semicircular part B having the inclined mortises E F, substantially as described, and for the purposes set forth.

JOSEPH WHITAKER.

Witnesses:
NATHAN K. ELLSWORTH,
W. READ.